US012165801B2

(12) United States Patent
Park et al.

(10) Patent No.: US 12,165,801 B2
(45) Date of Patent: Dec. 10, 2024

(54) COIL COMPONENT

(71) Applicant: SAMSUNG ELECTRO-MECHANICS CO., LTD., Suwon-si (KR)

(72) Inventors: No Il Park, Suwon-si (KR); Seung Mo Lim, Suwon-si (KR); Tae Jun Choi, Suwon-si (KR); Boum Seock Kim, Suwon-si (KR); Tai Yon Cho, Suwon-si (KR); Byung Soo Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 847 days.

(21) Appl. No.: 17/176,684

(22) Filed: Feb. 16, 2021

(65) Prior Publication Data

US 2022/0148794 A1 May 12, 2022

(30) Foreign Application Priority Data

Nov. 10, 2020 (KR) ........................ 10-2020-0149366

(51) Int. Cl.

| | |
|---|---|
| ***H01F 5/00*** | (2006.01) |
| ***H01F 17/00*** | (2006.01) |
| ***H01F 17/04*** | (2006.01) |
| ***H01F 27/29*** | (2006.01) |
| ***H01F 27/32*** | (2006.01) |

(52) U.S. Cl.

CPC ....... *H01F 27/292* (2013.01); *H01F 17/0013* (2013.01); *H01F 17/04* (2013.01); *H01F 27/324* (2013.01); *H01F 2017/048* (2013.01)

(58) Field of Classification Search

CPC ..................................................... H01F 27/292

USPC ......................................................... 336/200

See application file for complete search history.

(56) References Cited

U.S. PATENT DOCUMENTS

2015/0200338 A1 7/2015 Kim et al.
2016/0172097 A1 * 6/2016 Jeong .................... H01F 41/046 29/606
2016/0268038 A1 9/2016 Choi
2018/0061551 A1 * 3/2018 Kondou ................ H01F 41/122
2019/0115127 A1 4/2019 Iso et al.

FOREIGN PATENT DOCUMENTS

JP 2019-75401 A 5/2019
KR 10-2015-0084312 A 7/2015
KR 10-2016-0108935 A 9/2016

OTHER PUBLICATIONS

English translation of JP2004158541 (Year: 2004).*
English translation of JP2007242806 (Year: 2007).*

* cited by examiner

*Primary Examiner* — Ronald Hinson
(74) *Attorney, Agent, or Firm* — MORGAN, LEWIS & BOCKIUS LLP

(57) ABSTRACT

A coil component includes a body including a first insulating resin, a coil unit disposed in the body, and first and second external electrodes disposed to be spaced apart from each other on the body and connected to the coil unit, wherein a first surface of the body has a recess portion, and an identification portion is disposed in the recess portion and includes a second insulating resin.

14 Claims, 4 Drawing Sheets

COIL COMPONENT

CROSS-REFERENCE TO RELATED APPLICATION

This application claims the benefit of priority to Korean Patent Application No. 10-2020-0149366 filed on Nov. 10, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices along with a resistor and a capacitor.

Meanwhile, a marking element may be provided on the coil component to identify a direction in which the coil component is mounted on a printed circuit board (PCB) or the like.

Such a marking element is identified using an identification device, and here, there may be a case where it is difficult to identify the marking element due to diffuse reflection of light on a surface of the marking element.

SUMMARY

An aspect of the present disclosure may provide a coil component in which an identification portion is easily identified.

According to an aspect of the present disclosure, a coil component may include: a body including a first insulating resin; a coil unit disposed in the body; and first and second external electrodes disposed to be spaced apart from each other on the body and connected to the coil unit, wherein a first surface of the body has a recess portion, and an identification portion is disposed in the recess portion and includes a second insulating resin.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
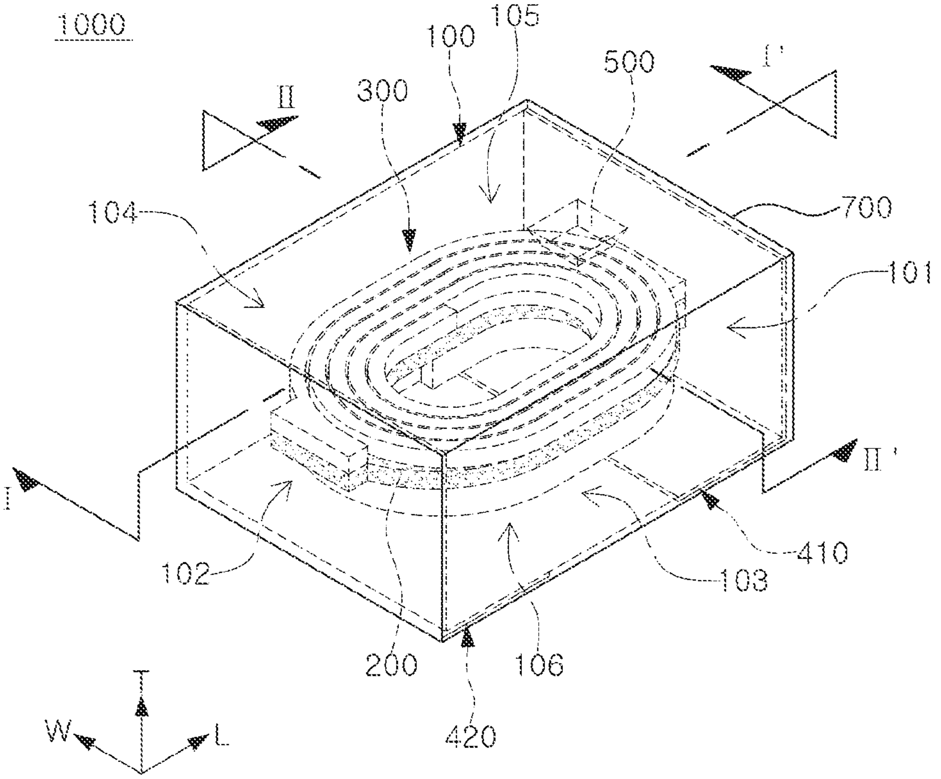
FIG. 1 is a perspective view schematically illustrating a coil component according to an exemplary embodiment in the present disclosure.

Exemplary embodiments in the present disclosure will now be described in detail with reference to the accompanying drawings.

In the drawings, an L direction may be defined as a first direction or a length direction, a W direction may be defined as a second direction or a width direction, and a T direction may be defined as a third direction or a thickness direction.

Hereinafter, a coil component according to an exemplary embodiment in the present disclosure will be described in detail with reference to the accompanying drawings, and in the description with reference to the accompanying drawings, the same or corresponding components are denoted by the same reference numerals and duplicate descriptions thereof will be omitted.

Various types of electronic components are used in electronic devices, and various types of coil components may be appropriately used between these electronic components to remove noise.

That is, in an electronic device, a coil component may be used as a power inductor, a high frequency (HF) inductor, a general bead, a high frequency bead (GHz bead), a common mode filter, and the like.

Figure 2:
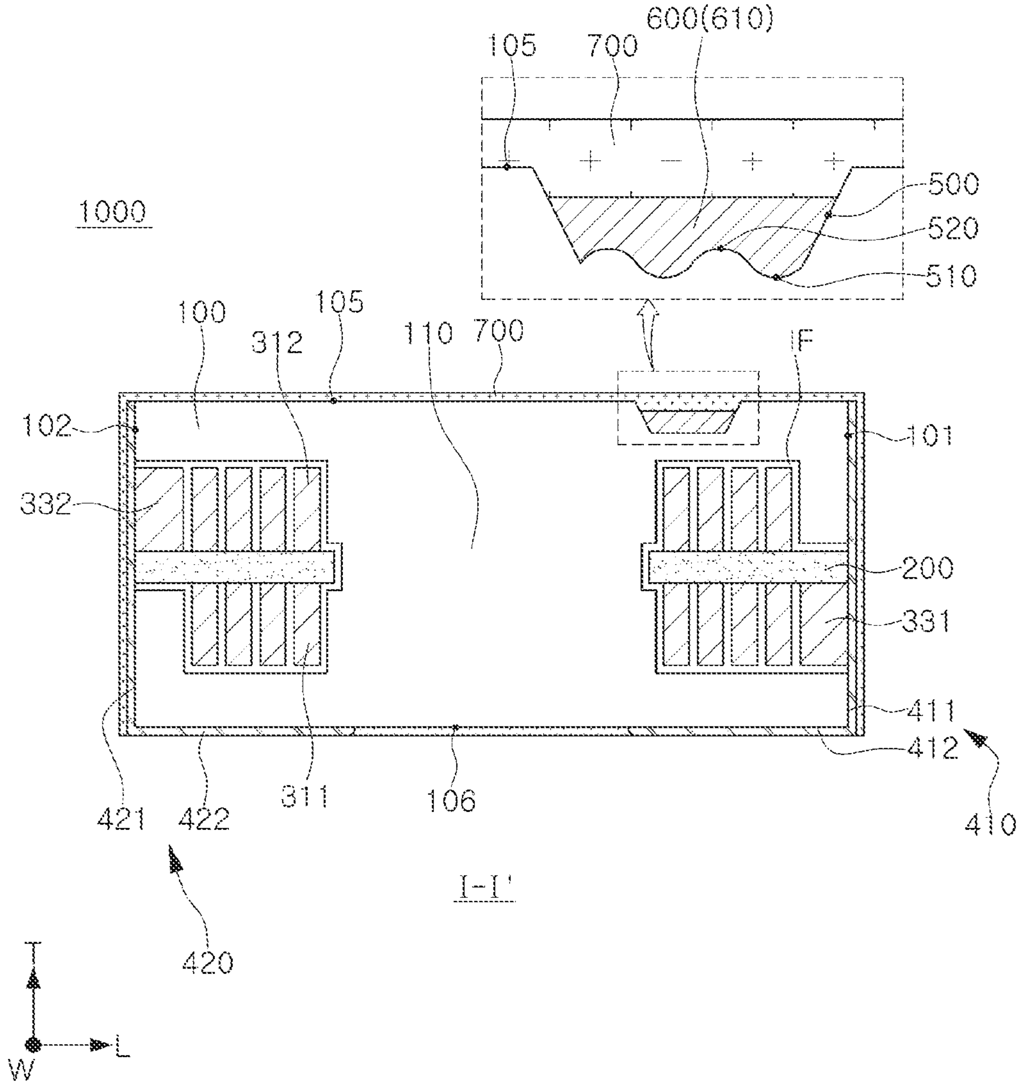
FIG. 2 is a cross-sectional view taken along line I-I' of FIG. 1.
Figure 3:
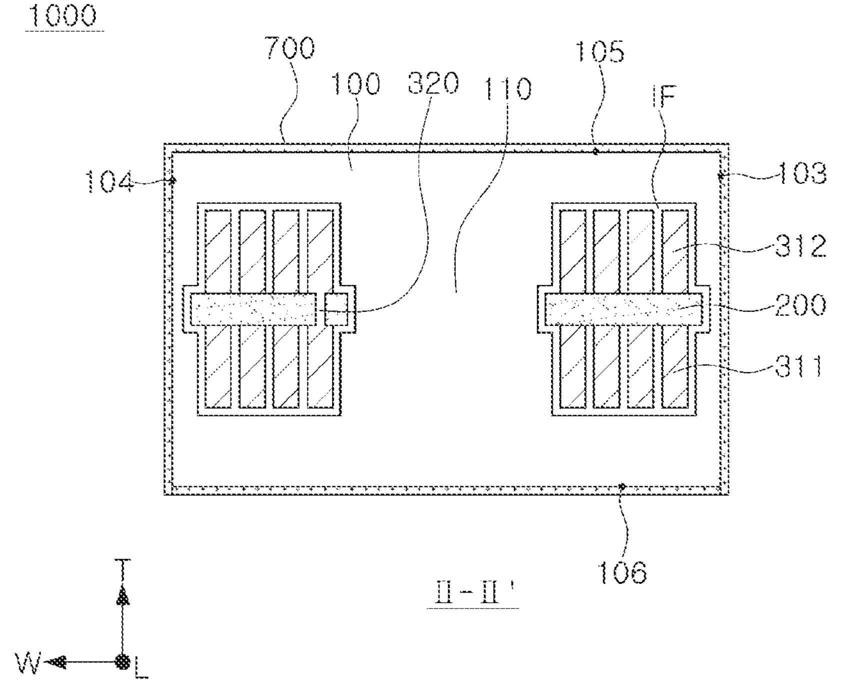
FIG. 3 is a cross-sectional view taken along line II-II' of FIG. 1.
Figure 4:
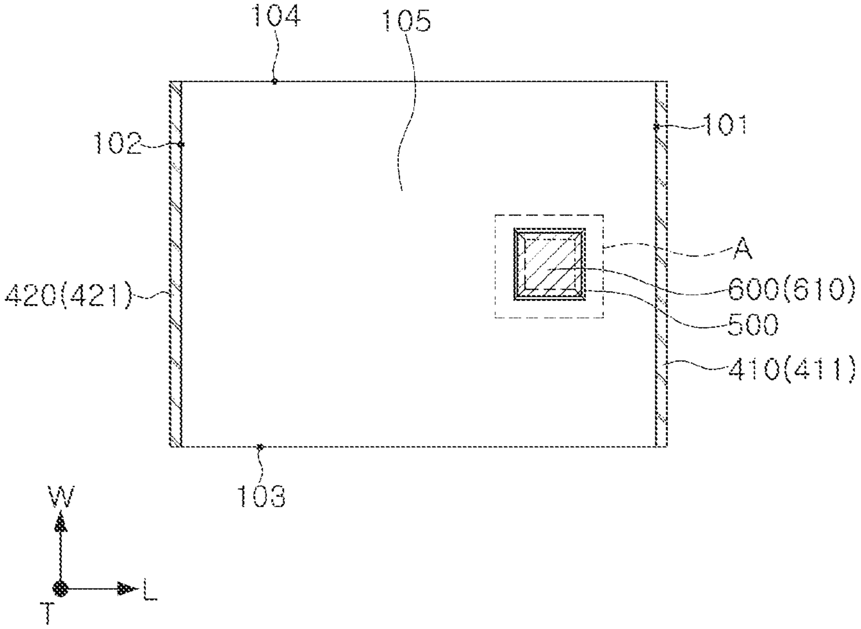
FIG. 4 is a top view of a coil component according to an exemplary embodiment in the present disclosure.
Figure 5:
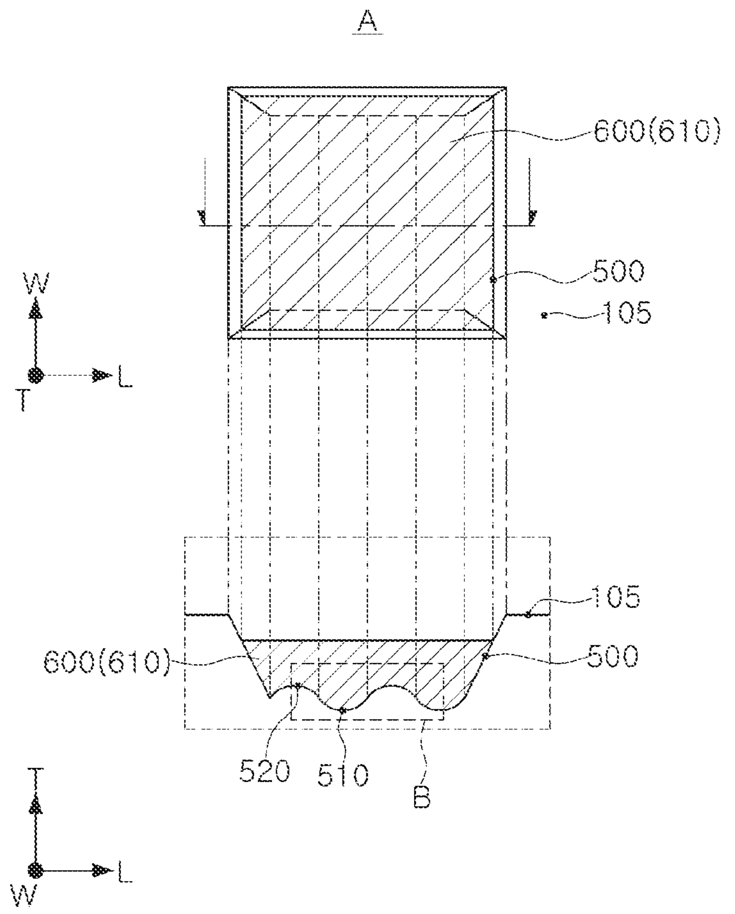
FIG. 5 is an enlarged view of a portion A in FIG. 4.
Figure 6:
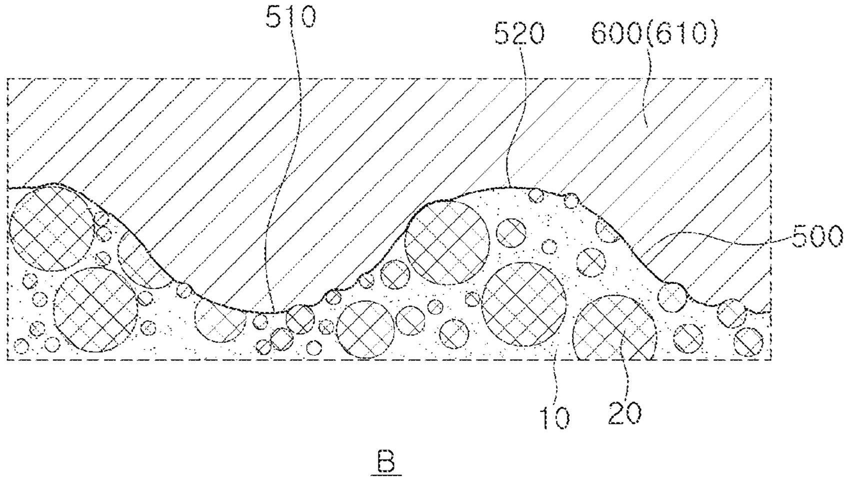
FIG. 6 is an enlarged view of a portion B of FIG. 5

FIG. 1 is a perspective view schematically illustrating a coil component according to an exemplary embodiment in the present disclosure. FIG. 2 is a cross-sectional view taken along line I-I' of FIG. 1. FIG. 3 is a cross-sectional view taken along line II-II' of FIG. 1. FIG. 4 is a top view of a coil component according to an exemplary embodiment in the present disclosure. FIG. 5 is an enlarged view of a portion A in FIG. 4. FIG. 6 is an enlarged view of a portion B of FIG. 5. Meanwhile, in FIGS. 5 and 6, a surface insulating layer illustrated in FIG. 1 is omitted in order to specifically illustrate a recess portion and an identification portion formed on a surface of a body.

Referring to FIGS. 1 to 6, a coil component 1000 according to an exemplary embodiment in the present disclosure may include a body 100, a support substrate 200, a coil unit 300, external electrodes 410 and 420, a recess portion 500, an identification portion 600, and a surface insulating layer 700, and may further include an insulating film IF.

The body 100 forms an exterior of the coil component 1000 according to the present exemplary embodiment, and the coil unit 300 and the support substrate 200 are disposed therein.

The body 100 may have a hexahedral shape as a whole.

Based on the directions of FIGS. 1 to 3, the body 100 includes a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 corresponds to a wall surface of the body 100 connecting the fifth surface 105 and the sixth surface 106 of the body 100. Hereinafter, two end surfaces (a first end surface and a second end surface) of the body 100 opposing in the length direction L may refer to the first surface 101 and the second surface 102 of the body, two side surfaces (a first side surface and a second side surface) of the body 100 opposing in the width direction W may refer to the third surface 103 and the fourth surface 104 of the body, and two surfaces of the body 100 opposing in the thickness direction T may refer to the fifth surface 105 and the sixth surface 106 of the body 100, respectively.

By way of example, the body 100 may be formed such that the coil component 1000 according to the present exemplary embodiment including external electrodes 410 and 420 and a surface insulating layer 700 to be described later has a length of 2.0 mm, a width of 1.2 mm, and a thickness of 0.65 mm but is not limited thereto. Meanwhile, the aforementioned dimensions are merely design values that do not reflect process errors, and the like, and thus, it should be appreciated that dimensions within a range admitted as a process error fall within the scope of the present disclosure.

Based on an optical microscope or a scanning electron microscope (SEM) image for a length directional (L)-thickness directional (T) cross-section at a width-directional (W) central portion of the coil component 1000, the length of the coil component 1000 may refer to a maximum value among lengths of a plurality of segments parallel to the length direction L when outermost boundary lines of the coil component 1000 illustrated in the image of the cross-section are connected. Alternatively, the length of the coil component 1000 described above may refer to an arithmetic mean value of at least three of the plurality of segments parallel in the length direction L when the outermost boundary lines of the coil component 1000 illustrated in the cross-sectional image are connected.

Based on the optical microscope or SEM image for the length directional (L)-thickness directional (T) cross-section at the width-directional (W) central portion of the coil component 1000, the thickness of the coil component 1000 may refer to a maximum value among lengths of a plurality of segments parallel to the thickness direction T when outermost boundary lines of the coil component 1000 illustrated in the image of the cross-section are connected. Alternatively, the thickness of the coil component 1000 described above may refer to an arithmetic mean value of at least three of the plurality of segments parallel in the thickness direction T when the outermost boundary lines of the coil component 1000 illustrated in the cross-sectional image are connected.

Based on an optical microscope or SEM image for a length directional (L)-width directional (W) cross-section at a thickness-directional (T)-central portion of the coil component 1000, the width of the coil component 1000 may refer to a maximum value among lengths of a plurality of segments parallel to the width direction W when outermost boundary lines of the coil component 1000 illustrated in the image of the cross-section are connected. Alternatively, the width of the coil component 1000 described above may refer to an arithmetic mean value of at least three of the plurality of segments parallel in the width direction W when the outermost boundary lines of the coil component 1000 illustrated in the cross-sectional image are connected.

Alternatively, each of the length, width, and thickness of the coil component 1000 may be measured by a micrometer measurement method. With the micrometer measurement method, each of the length, width, and thickness of the coil component 1000 may be measured by setting a zero point with a gage repeatability and reproducibility (R&R) micrometer, inserting the coil component 1000 according to the present exemplary embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 may include an insulating resin 10 and a magnetic material 20. Specifically, the body 100 may be formed by stacking one or more magnetic composite sheets in which the magnetic material 20 is dispersed in the insulating resin 10. The magnetic material 20 may be ferrite or a magnetic metal powder.

Ferrite may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

Magnetic metal powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

The magnetic metal powder may be amorphous or crystalline. For example, the magnetic metal powder may be Fe—Si—B—Cr-based amorphous alloy powder, but is not limited thereto.

Ferrite and the magnetic metal powder may each have an average diameter of about 0.1 μm to 30 μm, but are not limited thereto.

The body 100 may include two or more types of magnetic materials dispersed in a resin. Here, the different types of magnetic materials refer to that magnetic materials dispersed in a resin are distinguished from each other by any one of an average diameter, a composition, crystallinity, and a shape.

Meanwhile, hereinafter, it is assumed that the magnetic material is the metal magnetic powder 20, but the scope of the present disclosure is not limited only to the body 100 having a structure in which the magnetic metal powder 20 is dispersed in the insulating resin 10.

The insulating resin 10 may include, but is not limited to, epoxy, polyimide, liquid crystal polymer, or the like alone or in combination.

The body 100 includes a core 110 penetrating a central portion of each of the support substrate 200 and the coil unit 300 to be described later. The core 110 may be formed by filling a through hole through penetrating the central portion of each of the coil unit 300 and the support substrate 200 by the magnetic composite sheet, but is not limited thereto.

The support substrate 200 is embedded in the body 100. The support substrate 200 is configured to support the coil unit 300 to be described later.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of insulating materials such as prepreg, Ajinomoto build-up film (ABF), FR-4, a bismaleimide triazine (BT) resin, photo imageable dielectric (PID), and the like, but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. If the support substrate 200 is formed of an insulating material that does not contain glass fibers, the support substrate 20 is advantageous in reducing the thickness of the coil component 1000 according to the present exemplary embodiment. In addition, a volume occupied by the coil unit 300 and/or the magnetic material 20 may be increased based on the body 100 having the same size, thereby improving component characteristics. When the support substrate 200 is formed of an insulating material including a photosensitive insulating resin, the number of processes for forming the coil unit 300 may be reduced, which is advantageous in reducing production costs and forming fine vias.

The coil unit 300 is disposed inside the body 100 to manifest the characteristics of the coil component. For example, when the coil component 1000 of the present exemplary embodiment is used as a power inductor, the coil unit 300 may serve to stabilize power of an electronic device by storing an electric field as a magnetic field and maintaining an output voltage.

The coil unit 300 includes coil patterns 311 and 312, a via 320, and lead patterns 331 and 332. Specifically, based on the directions of FIGS. 1, 2, and 3, the first coil pattern 311 and the first lead pattern 331 are disposed on a lower surface of the support substrate 200 facing the sixth surface 106 of the body 100, and the second coil pattern 312 and the second lead pattern 332 are disposed on the upper surface of the support substrate 200 opposing the lower surface of the support substrate 200. The via 320 is in contact with and connected to an inner end of each of the first coil pattern 311 and the second coil pattern 312 through the support substrate 200. The first and second lead patterns 331 and 332 extend from the first and second coil patterns 311 and 312 and are exposed to the first and second surfaces 101 and 102 of the body 100, and are connected to the first and second external electrodes 410 and 420 to be described later, respectively. Accordingly, the coil unit 300 may function as a single coil as a whole, between the first and second external electrodes 410 and 420.

Each of the first coil pattern 311 and the second coil pattern 312 may have a shape of a planar spiral in which at least one turn is formed around the core 110. For example, the first coil pattern 311 may form at least one turn around the core 110 on the lower surface of the support substrate 200.

The lead patterns 331 and 332 are exposed to the first and second surfaces 101 and 102 of the body 100, respectively. Specifically, the first lead pattern 331 is exposed to the first surface 101 of the body 100, and the second lead pattern 332 is exposed to the second surface 102 of the body 100.

At least one of the coil patterns 311 and 312, the via 320, and the lead patterns 331 and 332 may include at least one conductive layer.

As an example, when the second coil pattern 312, the via 320, and the second lead pattern 332 are formed by plating on the upper surface side of the support substrate 200, the second coil pattern 312, the via 320, and the second lead pattern 332 may each include a seed layer and an electroplating layer. Here, the electroplating layer may have a single layer structure or a multilayer structure. The multilayered electroplating layer may be formed in a conformal film structure in which another electroplating layer is formed along a surface of any one electroplating layer or may be formed in a shape in which another electroplating layer is stacked only on one surface of any one electroplating layer. The seed layer may be formed by an electroless plating method or a vapor deposition method such as sputtering. The seed layer of each of the second coil pattern 312, the via 320, and the second lead pattern 332 may be formed integrally so that a boundary may not be formed therebetween, but is not limited thereto. The electroplating layer of each of the second coil pattern 312, the via 320, and the second lead pattern 332 may be integrally formed so that a boundary may not be formed therebetween, but is not limited thereto.

As another example, when the coil unit 300 is formed by separately forming the first coil pattern 311 and the first lead pattern 331 disposed on the lower surface side of the support substrate 200 and the second coil pattern 312 and the second lead pattern 332 disposed on the upper surface side of the support substrate 200 and subsequently collectively stacking the first coil pattern 311 and the first lead pattern 331 and the second coil pattern 312 and the second lead pattern 332 on the support substrate 200, the via 320 may include a high melting point metal layer and a low melting point metal layer having a melting point lower than that of the high melting point metal layer. Here, the low melting point metal layer may be formed of solder including lead (Pb) and/or tin (Sn). At least a part of the low melting point metal layer may be melted due to pressure and temperature at the time of collectively stacking to form, for example, an intermetallic compound (IMC) layer at a boundary between the low melting point metal layer and the second coil pattern 312.

As shown in FIGS. 2 and 3, as an example, the coil patterns 311 and 312 and the lead patterns 331 and 332 may be formed on and protrude from the lower surface and the upper surface of the support substrate 200, respectively. As another example, the first coil pattern 311 and the first lead pattern 331 may protrude from the lower surface of the support substrate 200, and the second coil pattern 312 and the second lead pattern 332 may be embedded in the upper surface of the support substrate 200. Upper surfaces of the second coil pattern 312 and the second lead pattern 332 may be exposed to the upper surface of the support substrate 200. In this case, a concave portion may be formed on at least one of the upper surface of the second coil pattern 312 or the upper surface of the second lead pattern 332, so that the upper surface of the support substrate 200 and the at least one of the upper surface of the second coil pattern 312 or the upper surface of the second lead pattern 332 may not be coplanar or may be at different levels in the thickness direction T.

The coil patterns 311 and 312, the via 320, and the lead patterns 331 and 332 may each be formed of a conductive material such as copper (Cu), aluminum (Al), silver (Ag), tin (Sn), gold (Au), nickel (Ni), lead (Pb), titanium (Ti), chromium (Cr), or an alloy thereof, but is not limited thereto.

The external electrodes 410 and 420 are disposed spaced apart from each other on the body 100 and connected to the coil unit 300. In this exemplary embodiment, the external electrodes 410 and 420 include pad portions 412 and 422 disposed to be spaced apart from each other on the sixth surface 106 of the body 100 and connection portions 411 and 421 disposed on the first and second surfaces 101 and 102 of the body 100. Specifically, the first external electrode 410 includes a first connection portion 411 disposed on the first surface 101 of the body 100 and in contact with the first lead pattern 331 exposed to the first surface 101 of the body 100 and a first pad portion 412 extending from the first connection portion 411 to the sixth surface 106 of the body 100. The second external electrode 420 includes a second connection portion 421 disposed on the second surface 102 of the body 100 and in contact with the second lead pattern 332 exposed to the second surface 102 of the body 100 and a second pad portion 422 extending from the second connection portion 421 to the sixth surface 106 of the body 100. The first and second pad portions 412 and 422 are disposed to be spaced apart from each other on the sixth surface 106 of the body 100. The connection portions 411 and 421 and the pad portions 412 and 422 may be integrally formed together in the same process so that a boundary is not formed therebetween, but the scope of the present disclosure is not limited thereto.

The external electrodes 410 and 420 may be formed by a vapor deposition method such as sputtering and/or a plating method, but is not limited thereto.

The external electrodes 410 and 420 may be formed of copper (Cu), aluminum (Al), silver (Ag), tin (Sn), gold (Au), nickel (Ni), lead (Pb), chromium (Cr), titanium (Ti), or an alloy thereof, but is not limited thereto. The external electrodes 410 and 420 may be formed as single layer or may have a multi-layer structure. As an example, the first external electrode 410 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be formed to cover the first conductive layer, but the scope of the present disclosure is not limited thereto. At least one of the second conductive layer and the third conductive layer may be disposed only on the sixth surface 106 of the body 100, but the scope of the present disclosure is not limited thereto. The first conductive layer may be a plating layer or a conductive resin layer formed by applying and curing a conductive resin including a resin and a conductive powder containing at least one of copper (Cu) and silver (Ag). The second and third conductive layers may be plating layers, but the scope of the present disclosure is not limited thereto.

The insulating film IF is disposed between the coil unit 300 and the body 100, and between the support substrate 200 and the body 100. The insulating film IF may be formed along the surface of the support substrate 200 on which the coil patterns 311 and 312 and the lead patterns 331 and 332 are formed, but is not limited thereto. The insulating film IF is to insulate the coil unit 300 and the body 100, and may include a known insulating material such as parylene, but is not limited thereto. As another example, the insulating film IF may include an insulating material such as an epoxy resin other than ferrule. The insulating film IF may be formed by a vapor deposition method, but is not limited thereto. As another example, the insulating film IF may be formed by laminating and curing an insulating film for forming the insulating film IF on both surfaces of the support substrate 200 on which the coil unit 300 is formed, and the coil unit 300 It may be formed by coating and curing an insulating paste for forming an insulating film IF on both surfaces of the formed support substrate 200. Meanwhile, for the reasons described above, the insulating film IF is a configuration that may be omitted in this exemplary embodiment. That is, if the body 100 has sufficient electrical resistance at the designed operating current and voltage of the coil component 1000 according to the present exemplary embodiment, the insulating film IF may be omitted in this exemplary embodiment.

The recess portion 500 is formed on any one of the first to sixth surfaces 101, 102, 103, 104, 105, and 106 of the body 100. In this exemplary embodiment, the recess portion 500 is formed on the fifth surface 105 of the body 100 facing the sixth surface 106 of the body on which the pad portions 412 and 422 of the external electrodes 410 and 420 are disposed. The recess portion 500 may be formed by irradiating a laser onto a region of the fifth surface 105 of the body 100, for example, but the scope of the present disclosure is not limited thereto. The recess portion 500 may be formed by irradiating a laser to a region corresponding to the fifth surface of a plurality of bodies at a level of a coil bar in which the plurality of bodies are continuously formed with each other, but the scope of the present disclosure is not limited thereto.

In the recess portion 500, a sectional area of a region close to the fifth surface 105 of the body 100 may be larger than a sectional area of a region close to a bottom surface of the recess portion 500. As an example, based on the directions of FIGS. 1, 2 and 5B, a sectional area of a lower portion of the recess portion 500 (the area of the recess portion 500 in the length directional-width directional cross-section in this exemplary embodiment) may be larger than a sectional area of an upper portion of the recess portion 500 (the area of the recess portion 500 in the length directional-width directional cross-section in this exemplary embodiment). Since the recess portion 500 is formed by removing a region of the body 100 including the magnetic metal powder 20, an effective volume of the magnetic material of the body 100 may decrease as a volume of the recess portion 500 increases, resulting in a possibility of deterioration of component characteristics. Therefore, in this exemplary embodiment, the aforementioned problem may be solved by reducing the sectional area of the lower portion of the recess portion 500 to be smaller than the sectional area of the upper portion of the recess portion 500. The sectional areas of the upper and lower portions of the recess portion 500 (the area of the recess portion 500 in the length directional-width directional cross-section in this exemplary embodiment) may be formed in a shape corresponding to each other and may be circular, elliptical, or polygonal.

The sectional area of the recess portion 500 (the area of the recess portion 500 in the length directional-width directional cross-section in this exemplary embodiment) may decrease in a direction toward a bottom surface of the recess portion 500 from the fifth surface 105 of the body 100. Specifically, referring to FIGS. 2 and 5B, the recess portion 500 may have a tapered shape decreasing in width from the length directional (L)-thickness directional (T) cross-section toward the lower portion thereof. Since the recess portion 500 is formed in the tapered shape decreasing in width toward the lower portion thereof, an occurrence of a void in the identification portion 600 to be described later when filling the identification portion 600 in the recess portion 500 may be reduced. That is, in filling the recess portion 500 with a liquid or paste material to form the identification portion, an inner wall of the recess portion 500 may serve to guide the material for formation of the identification portion toward the bottom surface of the recess 500 due to the tapered shape of the recess portion 500.

The bottom surface of the recess portion 500 may include at least one depressed portion 510 and at least one protruding portion 520. Specifically, referring to FIGS. 2 and 5, the at least one depressed portion 510 may be disposed at a relatively low position and the at least one protruding portion 520 may be disposed at a relatively high position to each other. Each of the depression portion 510 and the protrusion portion 520 may be formed in a slit shape extending in the width direction W of the body 100 based on the direction of FIG. 5. In addition, each of the depression portion 510 and the protrusion portion 520 may be provided in plurality. The plurality of depression portions 510 may be spaced apart from each other in the length direction L of the body 100 and the plurality of protrusion portions 520 may be spaced apart from each other in the length direction L of the body 100. The depression portion 510 and the protrusion portion 520 may be alternately arranged in the length direction L of the body 100. Due to the depression portion 510 and the protrusion portion 520 formed on the bottom surface of the recess portion 500, a surface area of the bottom surface of the recess portion 500 increases. As a result, a coupling force between the identification portion 600 to be described later and the bottom surface of the recess portion 500 may be improved. Meanwhile, since the body 100 includes the magnetic metal powder 20, at least a part of the magnetic metal powder 20 may be exposed to an inner surface (inner wall and bottom surface) of the recess portion 500. Accordingly, the depressed portion 510 and the protruding portion 520 may expose the magnetic metal powder 20 to the bottom surface of the recess portion 500.

The identification portion 600 may be formed to identify amounting direction, and the like, when the coil component 1000 according to the present exemplary embodiment is mounted on a printed circuit board (PCB) or the like.

The identification portion 600 fills the recess portion 500 and includes an insulating resin 610. The identification portion 600 may include an insulating resin 610 which is the same as the insulating resin 10 of the body 100. Since the body 100 and the identification portion 600 include the same insulating resin as the body 100, a coupling force between the body 100 and the identification portion 600 may be improved. The insulating resin 610 of the identification portion 600 may include, but is not limited to, epoxy, polyimide, liquid crystal polymer, or the like alone or as a mixture. The insulating resin 610 may include, for example, a curable polymer such as epoxy, but is not limited thereto. The identification portion 600 may further include at least one of an organic filler and an inorganic filler dispersed in the insulating resin 610.

The identification portion 600 has a first surface in contact with the bottom surface of the recess portion 500 and a second surface opposing the first surface of the identification portion 600. The second surface of the identification portion 600 may be located at a lower level than the fifth surface 105 of the body 100. That is, based on the direction of FIGS. 2 and 5B, the identification portion 600 may have an upper surface and a lower surface, and the upper surface of the identification portion 600 may be located at a level lower than the fifth surface 105 of the body 100. If a material for forming the identification portion includes a curable insulating resin, it may be difficult to precisely control a shape and out-line of the identification portion due to the curing of the insulating resin. This may cause a recognition error of an identification portion recognizing device. In this exemplary embodiment, since the upper surface of the identification portion 600 is located at a level lower than the fifth surface 105 of the body 100, the out-line of the identification portion 600 may correspond to a shape of a sectional area of the recess portion 500.

The coil component 1000 according to the present exemplary embodiment may further include a surface insulating layer 700 disposed on the fifth surface 105 of the body 100 to cover the identification portion 600. Since the surface insulating layer 700 covers the identification portion 600, the identification portion 600 may be protected from the outside.

The surface insulating layer 700 is in contact with the upper surface of the identification portion 600. Therefore, when the upper surface of the identification portion 600 is located at a level relatively lower than the fifth surface of the body 100, the surface insulating layer 700 fills at least a part of the recess portion 500 such that at least a part of the surface insulating layer 700 is in contact with the upper surface of the identification portion 600.

The surface insulating layer 700 may extend to at least a portion of the first to fourth and sixth surfaces 101, 102, 103, 104, and 106 of the body 100 from the fifth surface 105 of the body 100. In this exemplary embodiment, the surface insulating layer 700 is disposed on each of the first to fifth surfaces 101, 102, 103, 104, and 105 of the body 100 and may be disposed in a region of the sixth surface 106 of the body 100, excluding a region in which the pad portions 412 and 422 are disposed. The surface insulating layer 700 disposed on the first and second surfaces 101 and 102 of the body 100 may cover the connection portions 411 and 422 of the external electrodes 410 and 420.

At least a portion of the surface insulating layers 700 disposed respectively on the first to sixth surfaces 101, 102, 103, 104, 105, and 106 of the body 100 are integrally formed in the same process without a boundary therebetween, but the scope of the present disclosure is not limited thereto.

The surface insulating layer 700 may include a thermoplastic resin such as polystyrene, vinyl acetate, polyester, polyethylene, polypropylene, polyamide, rubber, acrylic, and the like, a thermosetting resin such as phenol, epoxy, urethane, melamine, alkyd, and the like, a photosensitive resin, parylene, SiOx, or SiNx. The surface insulating layer 700 may further include an insulating filler such as an inorganic filler, but is not limited thereto.

As set forth above, according to exemplary embodiments of the present disclosure, the coil component in which the identification portion is more easily identified may be provided.

While exemplary embodiments have been shown and described above, it will be apparent to those skilled in the art that modifications and variations could be made without departing from the scope of the present invention as defined by the appended claims.

What is claimed is:

1. A coil component comprising:

a body including a first insulating resin;

a coil unit disposed in the body; and first and second external electrodes disposed to be spaced apart from each other on the body and connected to the coil unit, wherein a first surface of the body has a recess portion, the recess portion includes a tapered side surface extending from the first surface and a bottom surface extending from the tapered side surface, wherein an identification portion is disposed in the recess portion and includes a second insulating resin, and wherein the bottom surface of the recess portion includes a plurality of depressed portions and a plurality of protruding portions which are spaced apart from the first surface by the tapered side surface interposed therebetween.

2. The coil component of claim 1, wherein the first insulating resin of the body and the second insulating resin of the identification portion include a same material.

3. The coil component of claim 1, wherein the identification portion has a first surface and a second surface facing the first surface of the identification portion, and the first surface of the identification portion is in contact with the bottom surface of the recess portion and the second surface of the identification portion is located at a level lower than a level of the first surface of the body.

4. The coil component of claim 3, further comprising:

a surface insulating layer disposed on the first surface of the body and covering the identification portion, wherein the surface insulating layer is disposed in at least a part of the recess portion and is in contact with the second surface of the identification portion.

5. The coil component of claim 1, wherein a sectional area of the recess portion adjacent to the first surface of the body is larger than a sectional area of the recess portion adjacent to the bottom surface of the recess portion.

6. The coil component of claim 5, wherein the sectional area of the recess portion decreases in a direction from the first surface of the body toward the bottom surface of the recess portion.

7. The coil component of claim 1, wherein each of the plurality of depressed and protruding portions has a slit shape extending in a first direction.

8. The coil component of claim 7, wherein the plurality of depressed portions are spaced apart from each other in a second direction perpendicular to the first direction.

9. The coil component of claim 1, wherein the body further includes a magnetic metal powder, and at least a part of the magnetic metal powder is exposed to the plurality of depressed and protruding portions.

10. The coil component of claim 1, wherein the body has a second surface opposing the first surface of the body, and the first and second external electrodes are spaced apart from each other on the second surface of the body.

11. The coil component of claim 10, further comprising:

a support substrate disposed in the body, wherein the coil unit includes first and second coil patterns disposed on opposing surfaces of the support substrate facing each other and a via connecting inner ends of the first and second coil patterns through the support substrate.

12. The coil component of claim 11, wherein the coil unit further includes first and second lead patterns extending from the first and second coil patterns and connected to the first and second external electrodes, respectively.

13. The coil component of claim 1, wherein the second insulating resin of the identification portion includes an epoxy.

14. The coil component of claim 1, wherein the identification portion further includes at least one of an organic filler or an inorganic filler dispersed in the second insulating resin.

* * * * *